United States Patent
Anter

(10) Patent No.: US 10,220,706 B2
(45) Date of Patent: Mar. 5, 2019

(54) SYSTEM AND METHOD FOR CUSTOMIZING A VEHICLE OPERATING ENVIRONMENT

(71) Applicant: Samsung Electronics Co., Ltd, Suwon-si (KR)

(72) Inventor: Nuri Gokhan Anter, Flemington, NJ (US)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 15/470,686

(22) Filed: Mar. 27, 2017

(65) Prior Publication Data

US 2017/0197507 A1    Jul. 13, 2017

Related U.S. Application Data

(63) Continuation of application No. 14/876,172, filed on Oct. 6, 2015, now Pat. No. 9,604,541.

(51) Int. Cl.
| | |
|---|---|
| *B60K 37/02* | (2006.01) |
| *B60R 16/037* | (2006.01) |
| *G06F 21/31* | (2013.01) |
| *H04L 29/08* | (2006.01) |
| *G06F 8/71* | (2018.01) |
| *B60R 16/02* | (2006.01) |

(52) U.S. Cl.
CPC .............. *B60K 37/02* (2013.01); *B60R 16/02* (2013.01); *B60R 16/037* (2013.01); *G06F 8/71* (2013.01); *G06F 21/31* (2013.01); *H04L 67/12* (2013.01)

(58) Field of Classification Search
CPC .............................. B60K 37/02; H04L 67/104
See application file for complete search history.

(56) References Cited

U.S. PATENT DOCUMENTS

| 7,520,431 | B2* | 4/2009 | Handa | G06Q 20/327 235/375 |
|---|---|---|---|---|
| 7,962,608 | B2* | 6/2011 | Nguyen | G08B 25/08 340/286.05 |
| 8,308,311 | B2* | 11/2012 | Eich | B60K 35/00 362/489 |
| 8,775,510 | B2* | 7/2014 | Westerhoff | G06F 17/30091 707/704 |
| 8,869,235 | B2* | 10/2014 | Qureshi | H04L 63/20 713/150 |
| 9,036,509 | B1* | 5/2015 | Addepalli | H04W 4/046 370/259 |
| 9,613,220 | B2* | 4/2017 | O'Hare | G06F 21/62 |
| 2009/0167515 | A1* | 7/2009 | Scherzinger | B60K 35/00 340/438 |

(Continued)

OTHER PUBLICATIONS

European Patent Office Communication, dated Dec. 5, 2017, regarding Application No. 16171773.1, 6 pages.

*Primary Examiner* — Alex C Dunn

(57) ABSTRACT

A method and system are presented for configuring a vehicle operating environment. An initial VOE configuration file and a VOE components file are provided to a VOE configuring application. A user employs the application to modify the VOE configuration file. The modified VOE configuration file is provided to a vehicle, where the vehicle uses the modified VOE configuration file to configure an operating environment of the vehicle.

29 Claims, 6 Drawing Sheets

(56) References Cited

U.S. PATENT DOCUMENTS

| | | | |
|---|---|---|---|
| 2010/0037057 A1* | 2/2010 | Shim | H04L 63/0823 713/171 |
| 2010/0063670 A1* | 3/2010 | Brzezinski | H04L 67/1095 701/31.4 |
| 2010/0097239 A1* | 4/2010 | Campbell | B60R 11/0252 340/4.4 |
| 2011/0001726 A1* | 1/2011 | Buckingham | G06F 3/0416 345/175 |
| 2011/0080278 A1 | 4/2011 | Crombez et al. | |
| 2011/0145833 A1* | 6/2011 | De Los Reyes | G06F 3/0488 718/106 |
| 2013/0117554 A1* | 5/2013 | Ylonen | H04L 9/08 713/151 |
| 2014/0309806 A1* | 10/2014 | Ricci | B60Q 1/00 701/1 |
| 2015/0215392 A1* | 7/2015 | Miebs | H04L 41/0806 709/201 |
| 2015/0222604 A1* | 8/2015 | Ylonen | H04L 63/062 713/171 |
| 2015/0381622 A1* | 12/2015 | Takayasu | G06F 21/31 726/9 |

* cited by examiner

SYSTEM AND METHOD FOR CUSTOMIZING A VEHICLE OPERATING ENVIRONMENT

CROSS-REFERENCE TO RELATED APPLICATIONS AND CLAIM OF PRIORITY

The present application claims priority to U.S. patent application Ser. No. 14/876,172 filed on Oct. 6, 2015, entitled "System and Method for Customizing a Vehicle Operating Environment" and issuing as U.S. Pat. No. 9,604,541 on Mar. 28, 2017.

TECHNICAL FIELD

The present application relates generally to dashboards for vehicles and, more specifically, to a system and method for customizing a vehicle operating environment.

BACKGROUND

The manufacturer of a vehicle typically determines the design and layout of a vehicle dashboard. Traditionally, the dials, gauges, indicators and other components of the dashboard were physical devices and the vehicle owner could only change the dashboard by physically removing, replacing, or adding dashboard components. For example, a racing enthusiast might add a tachometer by bolting it to the dashboard.

More recently, electronic displays have replaced physical dashboard components and the manufacturer may enable a display to cycle through a predetermined series of component displays. However, the sequence and number of components displayed is predetermined and, typically, cannot be changed by the vehicle owner. In this way, the manufacturer is in control of the 'look and feel' of the dashboard.

Some vehicles have the capability to store user preferences. Such preferences may include seat positions, mirror settings, radio station choices, air heating/cooling control settings, and others.

SUMMARY

In a first embodiment, a method of configuring a vehicle operating environment (VOE) includes providing an initial VOE configuration file and a VOE components file to a VOE configuring application. The method also includes obtaining a modified VOE configuration file from the VOE configuration application and providing the modified VOE configuration file to a vehicle, where the vehicle uses the modified VOE configuration file to configure an operating environment of the vehicle.

In a second embodiment, a system for configuring a VOE includes a memory, a communication interface and a processor. The memory includes one or more VOE component files and a plurality of VOE configuration files. The processor is configured to provide an initial VOE configuration file and a VOE components file to a VOE configuring application. The processor is also configured to obtain a modified VOE configuration file from the VOE configuration application and incorporate the modified VOE configuration file into the plurality of VOE configuration files. The processor is further configured to provide the modified VOE configuration file to a vehicle, where the vehicle uses the modified VOE configuration file to configure an operating environment of the vehicle.

In a third embodiment, a system for configuring a VOE includes a processor, a memory and a display. The memory and the display are coupled to the processor and the memory stores data and applications for use by the processor. The processor is configured to receive a VOE configuring application, store the application in the memory, and execute the application. The application is configured to receive an initial VOE configuration file and a VOE components file. The application is also configured to present a graphical representation of a dashboard of a vehicle using the display and receive user commands that control characteristics of VOE components displayed on the dashboard. The application is further configured to store a modified VOE configuration file and send the file to an external device.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system and method for customizing a vehicle operating environment.

Figure 1:
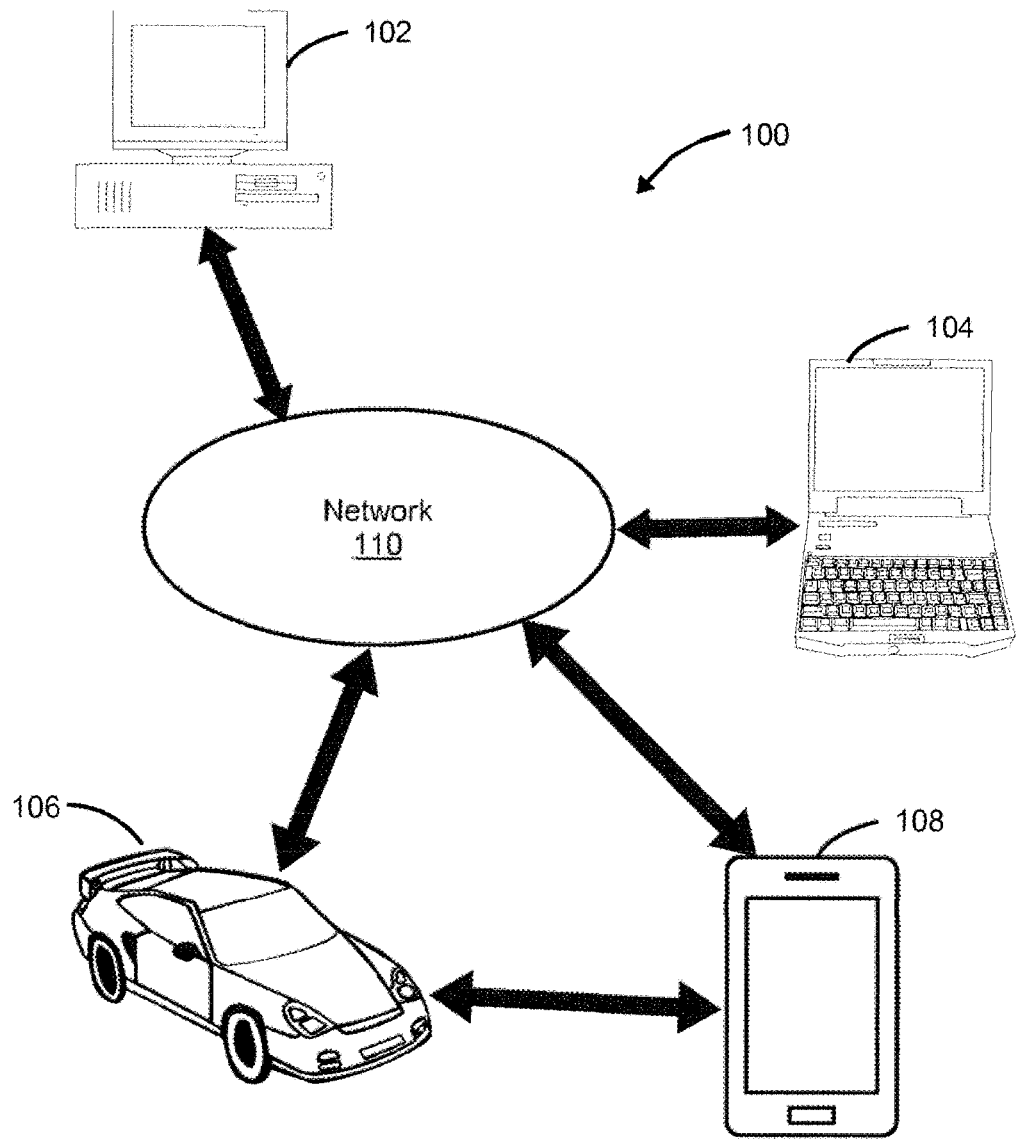
FIG. 1 illustrates a system for configuring a vehicle operating environment, according to the disclosure.

FIG. 1 illustrates a system 100 for configuring a vehicle operating environment (VOE), according to the disclosure. The system includes a manufacturer computer system 102 that may be used by a vehicle manufacturer to provide VOE configuration services to purchasers of the manufacturer's vehicles. In the alternative, the manufacturer may choose to subcontract the provision of such services to a third party, such as a cloud services or internet services provider. The computer system 102 is described in greater detail below, with reference to FIG. 4. A exemplary process that the system 100 may perform for configuring a vehicle operating environment is described in greater detail below, with reference to FIG. 6.

The system 100 also includes an owner computer system 104 that an owner of a vehicle may use to configure a VOE of the vehicle. The owner computer system 104 and the manufacturer computer system 102 communicate with each other via a network 110. The network 110 may be the Internet or other wide-area network (WAN), a local-area network (LAN), or any other suitable network providing communication between computer systems. The computer system 104 is described in greater detail below, with reference to FIG. 3.

The system 100 may also include a portable computing device 108. Examples of such a portable device include, but are not limited to, a smart phone, tablet, and laptop. The portable device 108 communicates with the manufacturer computer system 102, preferably via a wireless data communication link, such as a cellular data link, a WiFi link, or other suitable wireless data communication link. The portable device 108 is described in greater detail below, with reference to FIG. 2.

The system 100 also includes a vehicle 106 adapted to provide a configurable vehicle operating environment. While the vehicle 106 shown in FIG. 1 is an automobile, it will be understood that in other embodiments, the vehicle 106 may be a motorcycle, bicycle, truck, a boat, or other type of vehicle. In some embodiments, the vehicle 106 communicates with the portable device 108 to receive a VOE configuration file specifying the configuration of the VOE of the vehicle 106. In other embodiments, the vehicle 106 communicates directly with the manufacturer computer system 102 via the network 110 to receive a VOE configuration file. A control system of the vehicle 106 is described in greater detail below, with reference to FIG. 5.

Figure 2:
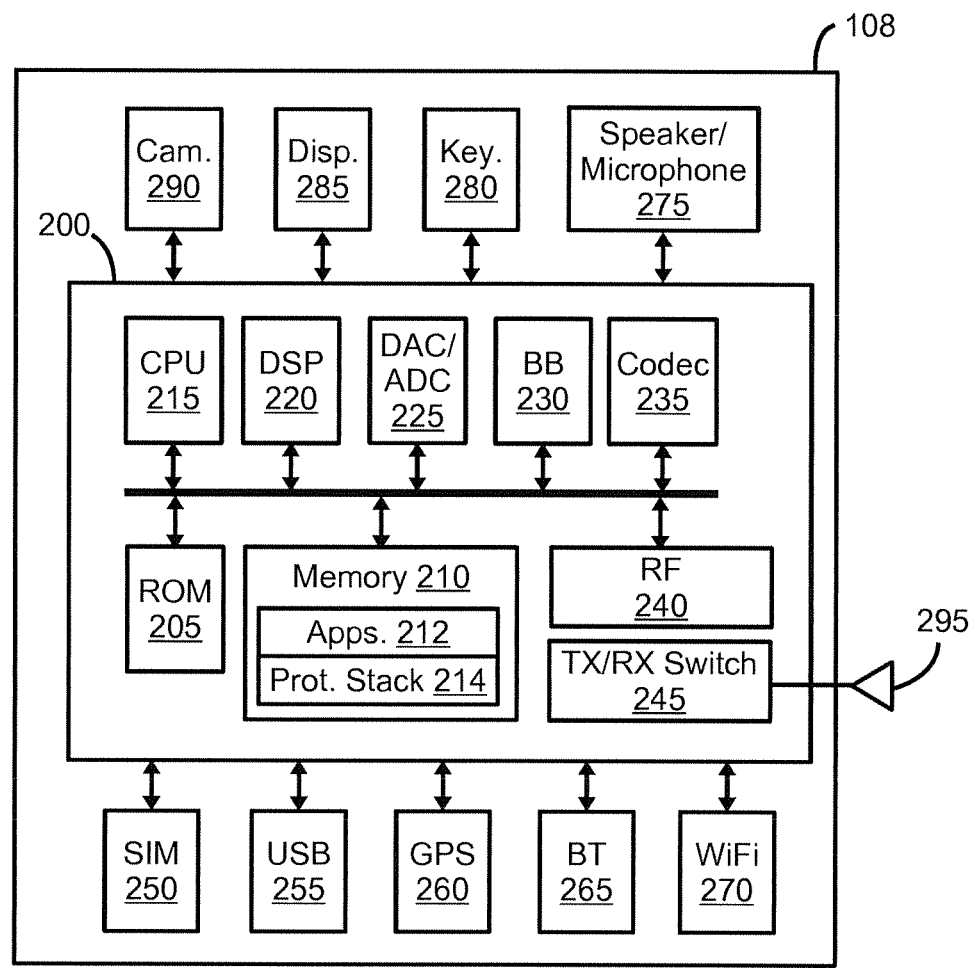
FIG. 2 provides a block diagram of a portable device for use in a system for configuring a vehicle operating environment, according to the disclosure.

FIG. 2 provides a block diagram of a portable computing device (PD) 108 for use in a system for configuring a VOE, according to the disclosure. The PD 108 may be a mobile phone, tablet, laptop, or other suitable portable device. The PD 108 may include a secure area suitable for executing an application configured to receive a VOE configuration file from the manufacturer computer system 102 and to send the VOE configuration file to a control system of the vehicle 106, as shown and described with reference to FIG. 1. The PD 108 comprises core circuitry 200, which includes read-only memory (ROM) 205, random access memory (RAM) 210, central processing unit (CPU) 215, digital signal processor (DSP) 220, digital-to-analog converter (DAC)/analog-to-digital converter (ADC) circuitry 225, baseband (BB) circuitry block 230, codec circuitry block 235, radio frequency (RF) circuitry block 240, transmit (TX)/receive (RX) switch 245, and antenna 295.

In one embodiment, ROM 205 may store a boot-routine and other static data and RAM 210 may store an operating system (not shown), applications 212, and protocol stack 214. The ROM 205 and RAM 210 include a trusted execution environment or other secure area in which the confidentiality and integrity of code and data may be ensured. In an advantageous embodiment, ROM 205 and RAM 210 may comprise a single electronically erasable memory, such as a Flash memory, that is used in conjunction with a conventional RAM memory that is used to store dynamic data.

The PD 108 further comprises SIM card interface 250, USB interface 255, GPS receiver 260, Bluetooth (BT) transceiver 265, WiFi (or WLAN) transceiver 270, speaker and microphone circuitry block 275, keyboard 280, display 285, and camera 290. In some embodiment, keyboard 280 and display 285 may be implemented together as a touch screen display.

CPU 215 is responsible for the overall operation of GD 210. In an exemplary embodiment, CPU 215 executes applications 212 and protocol stack 214. CPU 215 runs the application layer and a wide variety of applications may be run in a smart phone implementation. Applications 212 may include audio, video, and image/graphics applications. CPU 215 may run applications 212 that support various audio formats such as MP3, MP4, WAV, and rm. CPU 215 may run image applications 212 that support JPEG image formats and video applications 212 that support video formats (e.g., MPEG-1 to MPEG-5). CPU 215 may support various operating systems (not shown), such as Symbian, java, android, RT-Linux, Palm, and the like. For time critical applications, CPU 215 runs a real-time operating system (RTOS). In addition to the physical layer, there are other layers, including protocol stack 214, that enable PD 108 to work with a network base station. In an exemplary embodiment, protocol stack 214 is ported on CPU 215.

DAC/ADC circuitry block 225 converts analog speech signals to digital signals, and vice versa, in GD 210. In the transmit path, the ADC-converted digital signal is sent to a speech coder. Various types of ADCs are available, including sigma delta type. Automatic gain control (AGC) and automatic frequency control (AFC) are used in the receive path to control gain and frequency. AGC helps maintain satisfactory DAC performance by keepings signals within the dynamic range of the DAC circuits. AFC keeps frequency error within limit to achieve better receiver performance.

Baseband (BB) circuitry block 230 may be implemented as part of DSP 220, which executes many of the baseband processing functions (i.e., physical layer, Layer 1, or L1 functions). BB circuitry block 230 may be ported on DSP 220 to meet the latency and power requirements of GD 210. BB circuitry block 230 converts voice and data to be carried over the air interface to I/Q baseband signals.

BB circuitry block 230 may change from modem to modem for various air interface standards, such as GSM, CDMA, Wimax, LTE, HSPA, and others. BB circuitry block 230 is often referred to as the physical layer, or Layer 1, or L1. For mobile phones that work on GSM networks, the baseband part (Layer 1) running on DSP 220 and the protocol stack 214 running on CPU 215 are based on the GSM standard. For CDMA mobile phones, the Layer 1 and protocol stack 214 are based on the CDMA standard, and so on, for the LTE and HSPA standards-based mobile phones.

For speech or audio inputs, codec circuitry block 235 may compress and decompress the signal to match the data rate to the frame in which the data is sent. By way of example, codec circuitry block 235 may convert speech at an 8 KHz sampling rate to a 13 kbps rate for a full rate speech traffic channel. To do this, a residually excited linear predictive coder (RELP) speech coder may be which compresses 260 bits into a 20 ms. duration to achieve a 13 kbps rate.

The baseband or physical layer adds redundant bits to enable error detection as well as error correction. Error detection may be obtained with CRC and error correction using forward error correction techniques, such as a convolutional encoder (used in transmitter path) and a viterbi decoder (used in receive path). Interleaving may be done for the data, which helps in spreading the error over time, thereby helping the receiver de-interleave and decode the frame correctly.

RF circuitry block 240 includes an RF up-converter and an RF down-converter. For a GSM system, the RF up-converter converts modulated baseband signals (I and Q) either at zero intermediate frequency (IF) or some IF to RF frequency (890-915 MHz). The RF down-converter converts RF signals (935 to 960 MHz) to baseband signals (I and Q). For a GSM system, GMSK modulation is used.

Antenna 295 is a metallic object that converts electric and electromagnetic signal to and electric signal and vice versa. Commonly used antennas may include a helix type, a planar inverted F-type, a whip, or a patch type. Microstrip patch type antennas are popular among mobile phones due to small size, easy integration on a printed circuit board and multi-frequency band of operation. In a preferred embodiment of GD 210, antenna 295 may support different wire-area standards, including GSM, CDMA, LTE, and WiMAX, as well as short-range standards, including WiFi (WLAN), Bluetooth, and so on.

If antenna 295 comprises only one antenna used for both transmit and receive operations at different times, the TX/RX switch 245 couples both the transmit (TX) path and the receive (RX) path to antenna 295 at different times. TX/RS switch 245 is controlled automatically by DSP 220 based on a GSM frame structure with respect to the physical slot allocated for that particular GSM mobile phone in both the downlink and the uplink. For frequency division duplexing (FDD) systems, TX/RX switch 245 may be implement as a diplexer that acts as filter to separate various frequency bands.

The PD 108 provides connectivity with laptops or other devices using WiFi (or WLAN) transceiver 270, BT transceiver 265, and universal serial bus (USB) interface 255. The PD 108 also uses GPS receiver 260 in applications 212 that require position information. If PD 108 is a conventional smart phone, applications 212 may include many popular applications, such as Facebook, Twitter, a browser, and numerous games that come pre-installed with GD 210.

Speaker and microphone circuitry block 275 comprises microphone circuitry (or mic) that converts acoustic energy (i.e., air pressure changes caused by speech or other sounds) to electrical signals for subsequent processing. Speaker and microphone 275 further comprises speaker circuitry that converts an electrical audio signal to an audible signal (pressure changes) for human hearing. The speaker circuitry may include an audio amplifier to get required amplification of the audio signal and may further include a volume control circuit to change (increase or decrease) the amplitude of the audio signal.

The PD 108 preferably includes camera 290. Presently, almost all mobile phones feature a camera module. Camera 290 may comprise a 12 megapixel, 14 megapixel, or even a 41 megapixel camera.

Display 285 may comprise, by way of example, a liquid crystal display (LCD), a thin-film transistor (TFT) screen, and organic light emitting diode (OLED) display, a thin film diode (TFD) display, or a touch screen of capacitive and resistive type.

In a simple embodiment, keypad 280 may comprise a simple matrix type keypad that contains numeric digits (0 to 9), alphabetic characters (A to Z), special characters, and specific function keys. In a more advanced embodiment for a smart phone implementation, keypad 280 may be implemented in the mobile phone software, so that keyboard 280 appears on display 285 and is operated by the user using the touch of a finger tip.

BB circuitry block 230, RF circuitry block 240, TX/RX switch 245, WiFi (or WLAN) transceiver 270, BT transceiver 265, and USB interface 255 comprise a communications interface that enables the PD 108 to communicate either wired or wirelessly with PMDs 104 and RS 106.

According to the principles of the disclosure, applications 212 include an application configured to receive a VOE configuration file from the manufacturer computer system 102 and to send the VOE configuration file to a control system of the vehicle 106, as shown and described with reference to FIG. 1.

Figure 3:
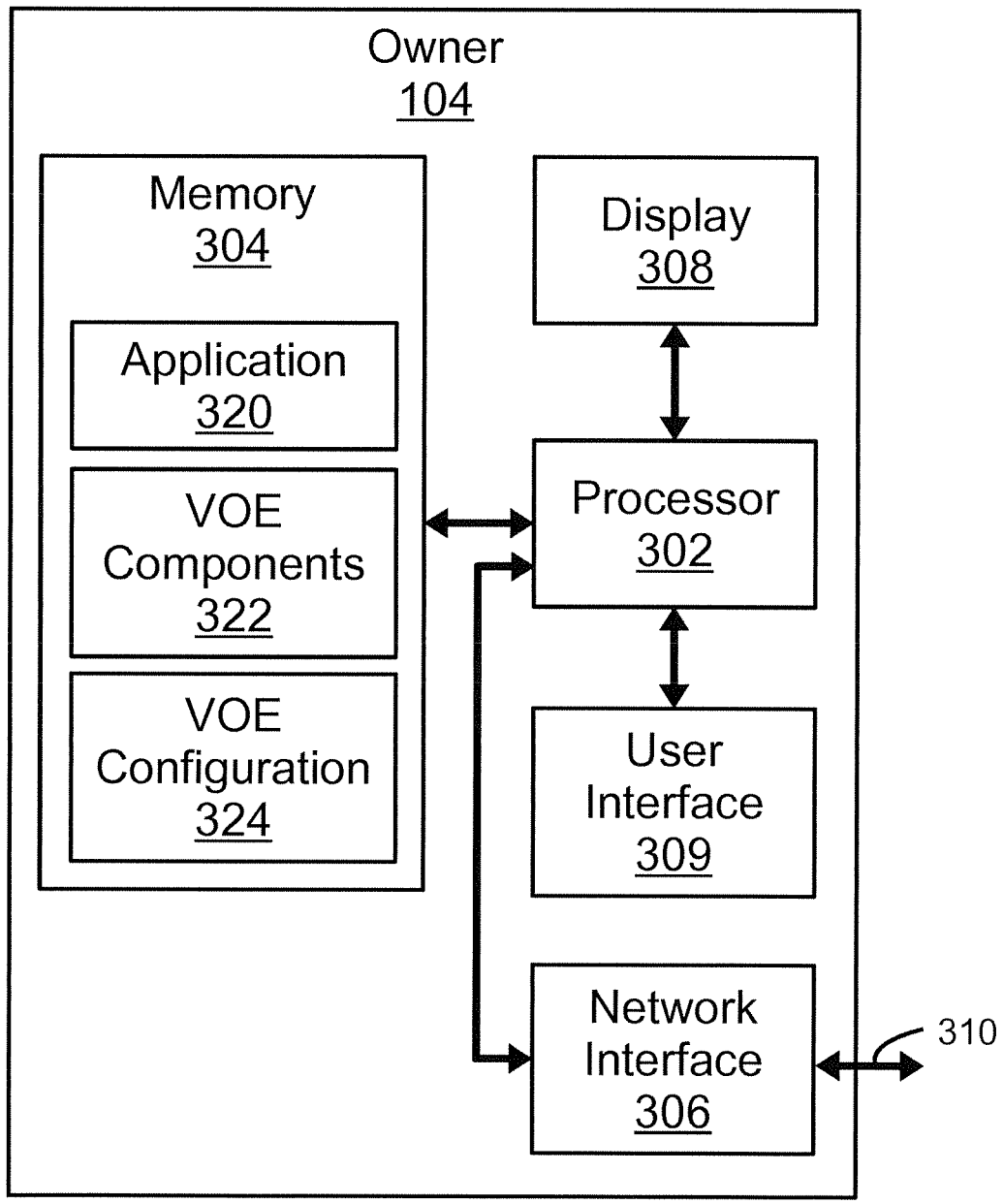
FIG. 3 provides a simplified block diagram of a system according to the disclosure that a user may employ to configure a vehicle operating environment.

FIG. 3 provides a simplified block diagram of a computer system 104 according to the disclosure that a vehicle owner or other user may employ to configure a VOE. The system 104 includes at least a processor 302, a memory 304, a network interface 306, a display 308, and a user interface 309. It will be understood that other elements will also be included in the system 104. The processor 302 is of the type that includes, but is not limited to microprocessors, microcontrollers, DSPs, FPGAs, or ASICs. The memory 304 may be conventional RAM memory or other suitable volatile or non-volatile memory that may be written to and read from. The network interface 306 may be of any technology suitable to provide the communication link 310 to the network 110. The user interface 309 provides circuitry to enable the processor 302 to control and communicate with user input/output devices such as, but not limited to, a mouse, a trackpad, or a touch screen input sensor. The system 104 may be a desktop, a laptop, a tablet, or any other suitable computer system.

The display 308 may be LCD, LED, plasma, CRT or other technology suitable for presenting a graphic display to a user. In other embodiments, the display 308 may be a virtual reality headset, providing the user with a 3D view of the interior of the vehicle. In this way, the user may observe in real time not only the dashboard but also other elements of the interior while configuring the vehicle operating environment.

The memory 304 includes a VOE configuration application 320, a VOE components file 322, and a VOE configuration file 324. In some embodiments, the application 302 is loaded into the memory 304 from a removable memory device, such as a CD or DVD. In some such embodiments, the VOE components file 322 is also loaded from the removable memory device. In other embodiments, the application 320 and/or the VOE components file 322 are loaded into the memory 304 from the manufacturer computer system 102. In still other embodiments, the application 320, the VOE components file 322, and the VOE configuration file 324 are resident on a cloud server in the network 110 and the application 320 is executed on the cloud server under control of a user of the owner computer system 104.

The VOE configuration application 320 presents a graphical display of a dashboard of the vehicle 106 and provides functionality that enables a user of the system 104 to configure parameters of VOE display components to be displayed on the vehicle dashboard. Such parameters may include, but are not limited to, position, size, and color of the display components. Some such parameters of the display components may be predefined or constrained by information in the VOE components file 322 relating to the display components. For example, the VOE components file 322 may provide a predefined appearance and a few predefined color themes for each of several display components. Such constraints would permit a vehicle manufacturer to maintain a desired look and feel in VOEs configured by a system according to the disclosure.

The application 320 stores or modifies parameters of VOE display components in the VOE configuration file 324. The VOE configuration file 324 is initially a file received from the manufacturer system 102. Such an initial VOE configuration file 324 may be a predefined default file or may be a previously modified file stored in the external device after a previous use of the application 320. When the user is finished modifying the VOE configuration file 324, the application 320 sends the modified file to the manufacturer system 102, for subsequent transfer to the vehicle 110, as will be described in greater detail with reference to other figures in this disclosure.

VOE components that may be displayed on a dashboard include, but are not limited to, odometers, speedometers, radio console and buttons. In other embodiments, the VOE configuration application 320 also stores parameters for other components of the vehicle operating environment of the vehicle 110. Such other components include, but are not limited to, preset selections of radio stations, selections of stored seat positions and/or mirror positions, heating/cooling system settings, and others for which the manufacturer of the vehicle 110 provides presetting functionality.

Preferably, prior to full operation, the application 320 engages in an authentication process with the manufacturer computer system 102. This authentication provides security to both the manufacturer and the vehicle owner that only the owner or the owner's designate is allowed to see and make changes to the VOE configuration file 324. Typically, such an authentication process requires that the user provide identifying information such as a user ID and password to the manufacturer system 102 to obtain access to one or more VOE configuration files belonging to the user. The user may also provide information identifying the vehicle for whose VOE configuration file access is being requested.

Figure 4:
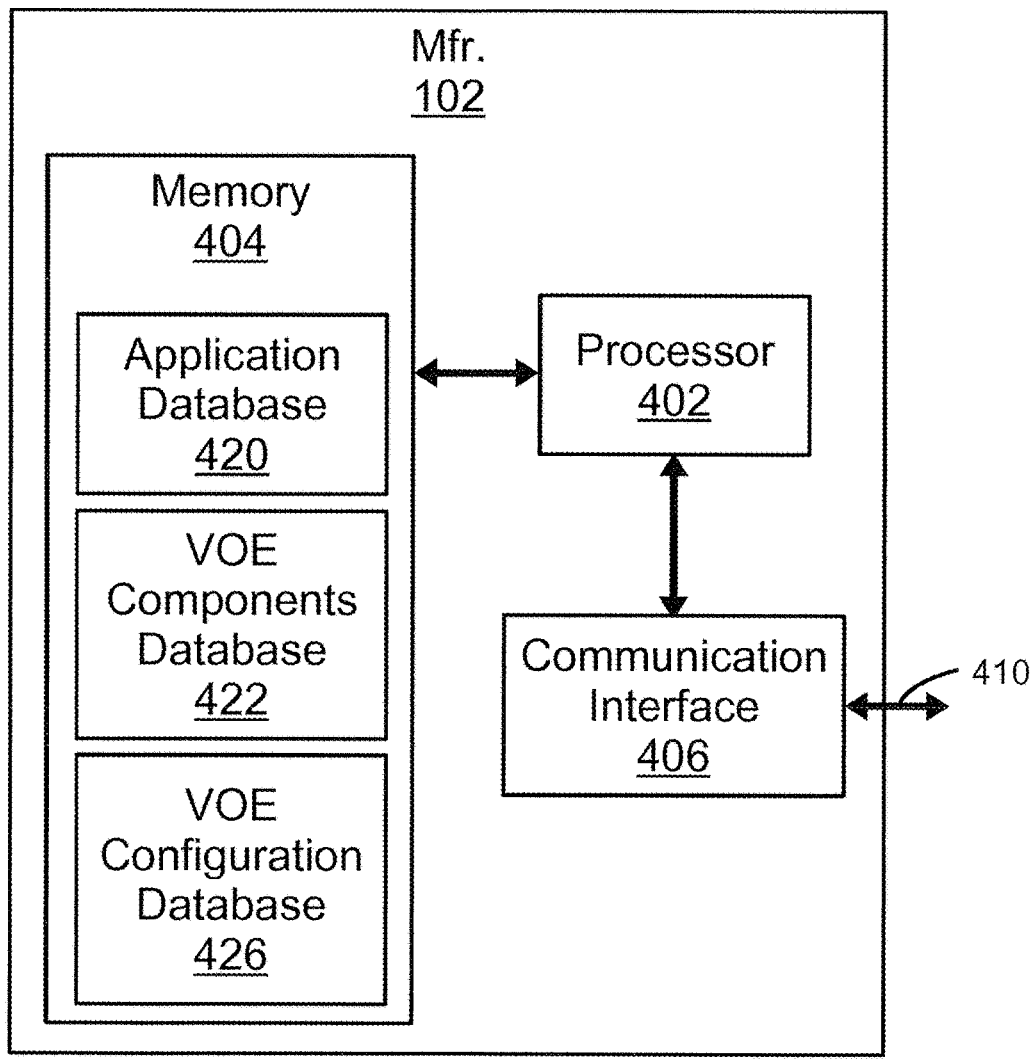
FIG. 4 provides a simplified block diagram of a system according to the disclosure that a vehicle manufacturer may employ to enable users to configure a vehicle operating environment.

FIG. 4 provides a simplified block diagram of a manufacturer computer system 102 according to the disclosure that a vehicle manufacturer may employ to enable users to configure a vehicle operating environment. The system 102 includes at least a processor 402, a memory 404, and a communication interface 406. It will be understood that other conventional computer system elements will also be included in the system 102. The processor 402 and the memory 404 may be of the types described with reference to the system 104 shown in FIG. 3. The communication interface 406 may provide for communication using one or more of a wired or wireless WAN, a wired or wireless LAN, and a removable memory device such as a FLASH memory, a CD, or a DVD.

The memory 404 includes a database 420 that includes an application for operation of the system 102, as well as one or more VOE configuration applications, a database 422 of one or more VOE component files, and a database 426 of one or more VOE configuration files. The database 420 may include VOE configuration applications for one or more computer operating systems, e.g., Windows, Macintosh, LINUX. The applications may provided differing levels of functionality to the user, for example allowing more or fewer types and numbers of VOE components, or greater or lesser degrees of customization of such components.

The database 422 may include VOE components files for a plurality of types of vehicles. The database 424 will preferably provide storage for VOE configuration files for a plurality of users and a plurality of vehicles. The database 424 also includes one or more default VOE configuration files.

The system 102 communicates with an owner computer system 104 seeking to modify a VOE configuration file. The system 102 authenticates a user of the system 104, as described above with reference to FIG. 3. Such authentication may be performed prior to providing a VOE components file and an initial VOE configuration file to the system 102. Otherwise, authentication is performed before accepting a modified VOE configuration file from the system 104.

The system 102 provides a VOE components file and an initial VOE configuration file to the system 104. In some cases, the initial VOE configuration file may be a default VOE configuration file, where no previous VOE configuration file has been stored for this user and vehicle. In other cases, a previously modified VOE configuration file has been stored in the database 426 and is provided to the system 104.

When the system 102 receives a modified VOE configuration file from the system 104, the system 102 stores (or otherwise incorporates) the modified VOE configuration file into the database 426. The system 102 also identifies a vehicle 106 associated with the modified VOE configuration file. Such identifying information may be stored within the VOE configuration file. In other embodiments, information identifying the vehicle 106 may be stored elsewhere in the memory 404, e.g., in data relating to the user of the system 104. Once the vehicle 106 is identified, the system 102 provides the modified VOE configuration file to the vehicle 106.

In a first embodiment, the system 102 stores the modified VOE configuration file onto a removable memory device, such as a flash memory device, CD or DVD. A person may then connect the removable memory device into the vehicle 106 and install the modified VOE configuration file into a control system of the vehicle 106.

In a second embodiment, a control system of the vehicle 106 is provided with wireless Internet connectivity, for example via a cellular data link or via WiFi when parked near a WiFi access point. In such an embodiment, the system 102 transfers the modified VOE configuration file directly to the control system of the vehicle 106 via the Internet connection.

In a third embodiment, the system 102 sends the modified VOE configuration file to the portable device 108. In one such embodiment, an identifier relating to the portable device 108 may be stored in the memory 404 and associated with the authenticated user of the system 104, and the system 102 pushes the modified VOE configuration file to the device 108. In another such embodiment, a user of the portable device 108 activates an app provided by the vehicle manufacturer, initiates an authentication process similar to that described above, and pulls the modified VOE configuration file onto the device 108. Such transfer of the modified VOE configuration file from the system 102 to the portable device 108 may be made via the Internet, using a cellular data or WiFi connection of the device 108, or via any other suitable data communication link.

In this third embodiment, once the modified VOE configuration file is provided to the portable device 108, the device 108 subsequently establishes a wired or wireless data communication link to a control system of the vehicle 106. Examples of such a link include, but are not limited to, a USB connection, a WiFi connection, or a Bluetooth connection. Once the device 108 and the control system of the vehicle 106 are communicatively coupled, the device 108 provides the modified VOE configuration file to the control system of the vehicle 106.

Where the vehicle 106 has more than one driver, each driver may use a system according to the disclosure to create a personalized VOE configuration file and store the file on his/her portable device 108. When the driver prepares to drive the vehicle 106, the driver may activate the manufacturer's app on the portable device 108 to provide his/her personalized VOE configuration file to the vehicle 106. In other embodiments, the vehicle 106 may sense the entry of the portable device 108 into the vehicle 106 (or vice versa) and the vehicle 106 or manufacturer's app automatically cause the driver's personalized VOE configuration file to the provided to the vehicle 106.

It will be understood that, while the system 102 is described herein as a standalone system communicating with other systems via the network 110, in other embodiments, the storage and functionality of the system 104 may be provided by a cloud server that is part of the network 110.

Figure 5:
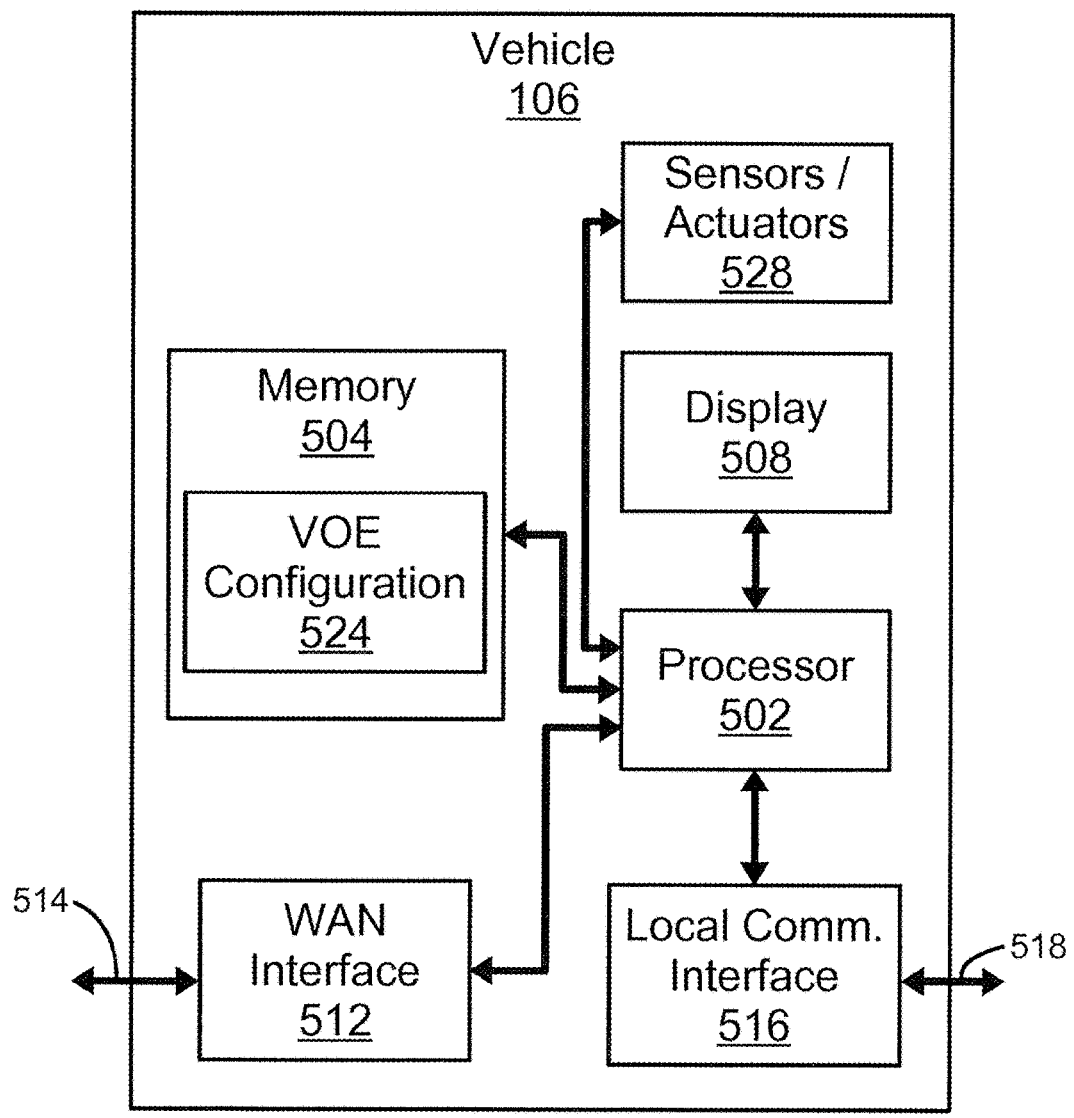
FIG. 5 provides a simplified block diagram of a control system of a vehicle according to the disclosure that is adapted for a configurable vehicle operating environment.

FIG. 5 provides a simplified block diagram of a control system 106 of a vehicle according to the disclosure that is adapted for a configurable vehicle operating environment. The system 106 includes at least a processor 502, a memory 504, a display 508, a WAN interface 512, a local communication interface 516, and a collection 528 of one or more sensors and/or actuators. It will be understood that other elements will also be included in the vehicle control system 106. The processor 502 and the memory 504 are of a type suitable for use in a vehicle and may be of the types described with reference to the system 104 shown in FIG. 3.

The processor 502 receives a VOE configuration file 524 and stores the file 524 in the memory 504. The processor 502 uses information from the file 524 to control display of display components and other information on the graphical display(s) and other indicators of the display 508. The processor may also use information from the file 524 to control radio and/or audio-visual subsystems (not shown), seat actuators, mirror actuators, and other components of the sensors and actuators 528.

The WAN interface 512 provides an Internet-capable communication link 514 using cellular data or WiFi communication to an Internet-connected WiFi access point. The processor 502 may receive the VOE configuration file 524 directly from the manufacturer system 102 via the WAN interface using the link 514. The local communication interface 516 provides a wired or wireless communication link 518. In some embodiments, the link 518 is a wired link, such as a USB interface or CD/DVD reader, operable to receive a removable memory device. In other embodiments, the link 518 link is a wireless link, such as a Bluetooth or a WiFi access point.

Figure 6:
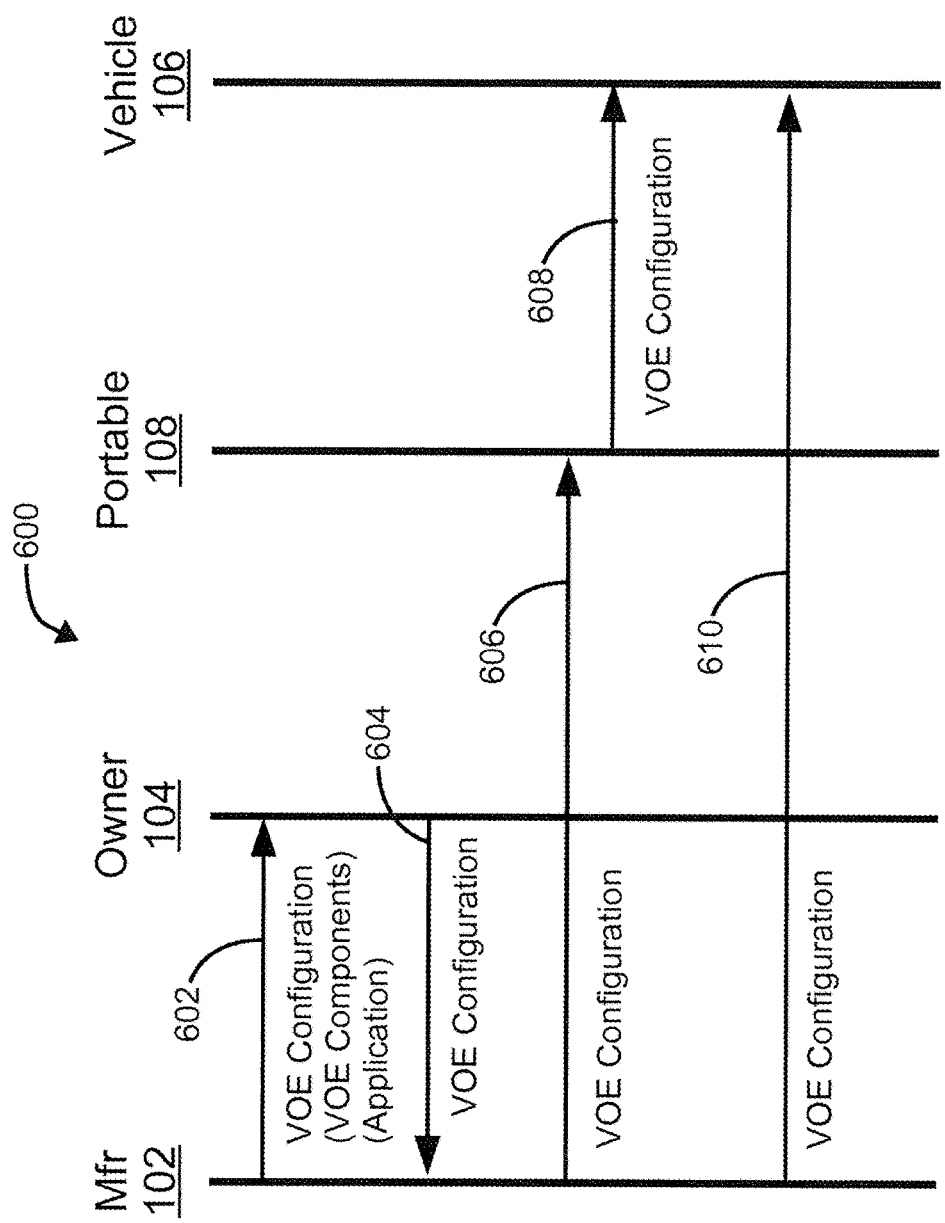
FIG. 6 illustrates a process for configuring a vehicle operating environment, according to the disclosure.

FIG. 6 illustrates a process 600 for configuring a vehicle operating environment, according to the disclosure. In step 602, an initial VOE configuration file is provided from the manufacturer system 102 to the owner system 104. The system 102 may also provide the system 104 a VOE configuration application and a VOE components file in step 602. In step 604, the system 102 receives from the system 104 a modified VOE configuration file. Between steps 602 and 604, the system 104 executes the VOE configuration application and a user of the system 104 modifies the received VOE configuration file.

After the system 102 receives the modified VOE configuration file in step 604, the system 102 stores the received modified VOE configuration file and, in a first embodiment of the process 600, in step 606, sends the modified VOE configuration file to the portable device 108. In step 608, the portable device 108 sends the modified VOE configuration file to the vehicle 106.

In a second embodiment of the process 600, in step 610, the system 102 sends the modified VOE configuration file directly to the vehicle 106. In all embodiments of the process 600, upon receiving the modified VOE configuration file, the vehicle 106 uses the file to configure an operating environment of the vehicle 106.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An apparatus for use in configuring a vehicle operating environment (VOE), the apparatus comprising:
    a memory comprising a plurality of VOE configuration files; and
    a processor, configured to:
        authenticate a user to modify at least one VOE configuration file by confirming an association between the vehicle and an identifier of the user, the identifier of the user received from a VOE configuring application on a portable device of the user;
        send the at least one VOE configuration file to the VOE configuring application;
        obtain a modified VOE configuration file from the VOE configuration application;
        store the modified VOE configuration file as one of the plurality of VOE configuration files; and
        transmit the modified VOE configuration file to a vehicle, wherein the modified VOE configuration file is operable to configure at least one physical parameter of an operating environment of the vehicle.

2. The apparatus of claim 1, wherein the plurality of VOE configuration files includes one or more default VOE configuration files, and the at least one VOE configuration file comprises one of a default VOE configuration file or a modified VOE configuration file.

3. The apparatus of claim 1, the memory further comprising one or more VOE configuring applications, wherein the processor is configured to provide one of the one or more VOE configuring applications to an external device, wherein the VOE configuring application is configured to receive the at least one VOE configuration file and provide the modified VOE configuration file to the apparatus.

4. The apparatus of claim 1, wherein authenticating the user comprises receiving at least one of user information relating to the user or vehicle information relating to the vehicle, and wherein the modified VOE configuration file is obtained from the VOE configuration application only after successfully authenticating the user of the VOE configuration application.

5. The apparatus of claim 1, wherein the processor is configured to provide the modified VOE configuration file to the portable device that is operable to provide the modified VOE configuration file to a control system of the vehicle.

6. The apparatus of claim 1, wherein the processor is configured to provide the modified VOE configuration file directly to a control system of the vehicle via wired or a wireless communication link.

7. The apparatus of claim 1, wherein the processor is configured to store the modified VOE configuration file on a removable memory device adapted to be read by a control system of the vehicle.

8. The apparatus of claim 1, wherein the modified VOE configuration file is adapted to control a display of display components on a dashboard of the vehicle.

9. The apparatus of claim 8, wherein the processor is configured to change the operating environment by changing one or more parameters of the operating environment, the one or more parameters comprising one or more of: a seat position, mirror position, audio entertainment settings, lighting levels or heating and cooling system settings.

10. The apparatus of claim 8, the display components comprise one of dashboard theme, position, size, or color of vehicle instrumentation such as odometer, speedometer, or radio console.

11. A portable electronic device capable of configuring a vehicle operating environment (VOE), the portable electronic device comprising:
one or more transceivers configured to communicate with at least one of a remote server and a vehicle; and
a processor, configured to:
provide, via a VOE configuring application executing on the portable electronic device, an identifier of a user to at least one of the remote server or the vehicle for authentication of the user;
request authorization to modify one or more VOE configuration files;
modify at least one of the one or more VOE configuration files; and
transferring the modified VOE configuration file to at least one of the remote server or the vehicle, wherein the modified VOE configuration file is configured to change at least one physical parameter of an operating environment of the vehicle.

12. The portable electronic device of claim 11, wherein the at least one of the one or more VOE configuration files is one of a default VOE configuration file and a modified VOE configuration file.

13. The portable electronic device of claim 11, wherein requesting authorization comprises sending at least one of user information relating to user of the vehicle or vehicle information relating to the vehicle.

14. The portable electronic device of claim 11, wherein transferring the modified VOE configuration file to the vehicle comprises transmitting, via the one or more transceivers, the modified VOE configuration file to a control system of the vehicle.

15. The portable electronic device of claim 11, wherein transferring the modified VOE configuration file to the vehicle comprises transmitting, via the one or more transceivers, the modified VOE configuration file to the remote server to be downloaded to a control system of the vehicle via a wireless communication link.

16. The portable electronic device of claim 11, wherein transferring the modified VOE configuration file to the vehicle comprises one of:
storing the modified VOE configuration file on a removable memory device adapted to be read by a control system of the vehicle; or
transferring the modified VOE configuration file directly to a control system of the vehicle via a wired communication link.

17. The portable electronic device of claim 11, wherein the modified VOE configuration file is adapted to control a display of display components on a dashboard of the vehicle.

18. The portable electronic device of claim 17, wherein the one or more parameters of the operating environment comprise one or more of: a seat position, mirror position, audio entertainment settings, lighting levels or heating and cooling system settings.

19. The portable electronic device of claim 17, wherein the display components comprise one of dashboard theme, position/size/color of vehicle instrumentation such as odometer, speedometer, or radio console.

20. A vehicle comprising:
a reconfigurable vehicle operating environment (VOE);
a communication interface configured to communicate with at least one of a remote server and a portable electronic device;
a memory configured to store one or more VOE configuration files; and
a processor, configured to:
authenticate a user to modify at least one VOE configuration file by confirming an association between the vehicle and an identifier of the user, the identifier of the user received from a VOE configuring application on a portable device of the user;
send the at least one VOE configuration file to the VOE configuring application;
obtain, via the communications interface, a modified VOE configuration file from the VOE configuration application;
store the modified VOE configuration file; and
in response to obtaining the modified VOE configuration file, change at least one physical parameter of an operating environment of the vehicle.

21. The vehicle of claim 20, wherein the one or more VOE configuration files includes one or more default VOE configuration files, and the at least one VOE configuration file comprises one of a default VOE configuration file or a modified VOE configuration file.

22. The vehicle of claim 20, the memory further comprising one or more VOE configuring applications, wherein the processor is configured to provide one of the one or more VOE configuring applications to the portable electronic device, wherein the VOE configuring application is configured to receive the at least one VOE configuration file and provide the modified VOE configuration file to the vehicle.

23. The vehicle of claim 20, wherein authenticating the user comprises receiving at least one of user information relating to the user or vehicle information relating to the vehicle, and wherein the modified VOE configuration file is obtained from the VOE configuration application only after successfully authenticating the user of the VOE configuration application.

24. The vehicle of claim 20, wherein the processor is configured to receive the modified VOE configuration file from the portable electronic device.

25. The vehicle of claim 20, wherein the processor is configured to receive the modified VOE configuration file from the remote server via a wireless communication link.

26. The vehicle of claim 20, wherein the processor is configured to receive the modified VOE configuration file from a removable memory device adapted to be read by a control system of the vehicle.

27. The vehicle of claim 20, wherein the processor is configured to modify a display of display components on a dashboard of the vehicle based on the modified VOE configuration file.

28. The vehicle of claim 27, wherein the one or more parameters of the operating environment comprise one or more of: a seat position, mirror position, audio entertainment settings, lighting levels or heating and cooling system settings.

29. The vehicle of claim 27, the display components comprise one of dashboard theme, position/size/color of vehicle instrumentation such as odometer, speedometer, or radio console.

* * * * *